(12) United States Patent
Nguyen

(10) Patent No.: US 7,161,524 B2
(45) Date of Patent: Jan. 9, 2007

(54) SYSTEM AND METHOD FOR USING AN UNIVERSAL REMOTE CONTROL TO ACCESS EXTENDED OPERATIONAL FUNCTIONS OF A DEVICE

(75) Inventor: Kimthoa Thi Nguyen, Anaheim Hills, CA (US)

(73) Assignee: Universal Electronics Inc., Cypress, CA (US)

( * ) Notice: Subject to any disclaimer, the term of this patent is extended or adjusted under 35 U.S.C. 154(b) by 333 days.

(21) Appl. No.: 10/401,378

(22) Filed: Mar. 28, 2003

(65) Prior Publication Data

US 2004/0189508 A1   Sep. 30, 2004

(51) Int. Cl.
*G08C 17/00* (2006.01)

(52) U.S. Cl. .................. 341/176; 345/169; 340/825.69

(58) Field of Classification Search ................ 341/176, 341/23; 340/825.69, 5.64, 825.57, 825.72; 345/169

See application file for complete search history.

(56) References Cited

U.S. PATENT DOCUMENTS

| | | | |
|---|---|---|---|
| 4,703,359 A | 10/1987 | Rumbolt et al. | |
| 4,959,810 A | 9/1990 | Darbee et al. | |
| 4,999,622 A * | 3/1991 | Amano et al. | 340/825.72 |
| 5,481,256 A | 1/1996 | Darbee et al. | |
| 5,515,052 A | 5/1996 | Darbee | |
| 5,614,906 A | 3/1997 | Hayes et al. | |
| 5,959,751 A | 9/1999 | Darbee et al. | |
| 6,091,884 A | 7/2000 | Yuen et al. | |
| 6,195,033 B1 | 2/2001 | Darbee et al. | |
| 6,771,182 B1 * | 8/2004 | Loh et al. | 340/825.72 |
| 6,998,997 B1 * | 2/2006 | Stevenson et al. | 340/825.22 |
| 2002/0084909 A1 * | 7/2002 | Stefanik et al. | 340/825.22 |

* cited by examiner

*Primary Examiner*—Wendy R. Garber
*Assistant Examiner*—Hung Q Dang
(74) *Attorney, Agent, or Firm*—Gary R. Jarosik

(57) ABSTRACT

A system and method for using an universal remote control to access extended operational functions of a device. A consumer causes the universal remote control to transmit a code data value selected from the library to a target device while observing the effect of the transmitted code data value on the target device. When the target device responds in a manner desired by the consumer, the consumer may tag the code data value that caused the desired effect and assign the tagged code data value to a programmable key on the universal remote control.

35 Claims, 12 Drawing Sheets

602

| Function | Device 1 | Device 2 | | Device n |
|---|---|---|---|---|
| | Format 17 | Format 9 | | Format m |
| | Data value | | | |
| Digit 0 | FF | 00 | | 30 |
| Digit 1 | FE | 01 | | 31 |
| Digit 2 | FD | 02 | | 32 |
| Digit 3 | FC | 03 | | 33 |
| Digit 4 | FB | 04 | | 34 |
| Digit 5 | FA | 05 | | 35 |
| Digit 6 | F9 | 06 | | 36 |
| Digit 7 | F8 | 07 | | 37 |
| Digit 8 | F7 | 08 | | 38 |
| Digit 9 | F6 | 09 | | 39 |
| Power | 7F | F0 | | 55 |
| Vol + | E1 | 33 | | C0 |
| Vol - | E2 | 34 | | C1 |
| Mute | E6 | 35 | | D3 |
| Chan + | D6 | 36 | | C4 |
| Chan - | D7 | 37 | | C5 |
| Last | D9 | 38 | | C6 |
| Sleep | 65 | 65 | | D7 |
| Input | A2 | 7D | | D9 |
| Guide | A3 | B1 | | DA |
| Exit | D2 | B2 | | DB |
| Menu | D3 | B3 | | DC |
| Info | D4 | B4 | | DD |
| Up | 2A | 77 | | 64 |
| Down | 2B | 78 | | 63 |
| Left | 2C | 79 | | 62 |
| Right | 2D | 7A | | 61 |
| Select | A7 | 7B | | E9 |

| Function | Device 001 Format 17 | Device 002 Format 9 | | Device nnn Format m |
|---|---|---|---|---|
| | | Data value | | |
| Digit 0 | FF | 00 | | 30 |
| Digit 1 | FE | 01 | | 31 |
| Digit 2 | FD | 02 | | 32 |
| Digit 3 | FC | 03 | | 33 |
| Digit 4 | FB | 04 | | 34 |
| Digit 5 | FA | 05 | | 35 |
| Digit 6 | F9 | 06 | | 36 |
| Digit 7 | F8 | 07 | | 37 |
| Digit 8 | F7 | 08 | | 38 |
| Digit 9 | F6 | 09 | | 39 |
| Power | 7F | F0 | | 55 |
| Vol + | E1 | 33 | | C0 |
| Vol - | E2 | 34 | | C1 |
| Mute | E6 | 35 | | D3 |
| Chan + | D6 | 36 | | C4 |
| Chan - | D7 | 37 | | C5 |
| Last | D9 | 38 | | C6 |
| Sleep | 65 | 65 | | D7 |
| Input | A2 | 7D | | D9 |
| Guide | A3 | B1 | | DA |
| Exit | D2 | B2 | | DB |
| Menu | D3 | B3 | | DC |
| Info | D4 | B4 | | DD |
| Up | 2A | 77 | | 64 |
| Down | 2B | 78 | | 63 |
| Left | 2C | 79 | | 62 |
| Right | 2D | 7A | | 61 |
| Select | A7 | 7B | | E9 |
| Extra A | 7A | F1 | | F7 |
| Extra B | 51 | C3 | | F1 |
| Extra C | C8 | C4 | | B3 |
| Extra D | C9 | 52 | | B5 |
| Extra E | DD | 55 | | EA |
| Extra F | 8F | 59 | | 7E |
| Extra G | 99 | D3 | | 7F |
| Extra H | 23 | D5 | | 19 |
| Extra I | 1C | 7A | | 2C |
| Extra J | 17 | 7B | | 1F |
| Extra K | 9C | 89 | | 13 |
| Extra L | 9E | 88 | | AE |
| Extra M | AB | 3A | | AF |
| Extra N | AC | 3A | | 96 |
| Extra O | AF | 3A | | F3 |
| Extra P | 73 | 3A | | 47 |

Figure 7

| Function | Device 1 Format 17 | Device 2 Format 9 | | Device n Format m |
|---|---|---|---|---|
| | | Data value | | |
| Digit 0 | FF | 00 | | 30 |
| Digit 1 | FE | 01 | | 31 |
| Digit 2 | FD | 02 | | 32 |
| Digit 3 | FC | 03 | | 33 |
| Digit 4 | FB | 04 | | 34 |
| Digit 5 | FA | 05 | | 35 |
| Digit 6 | F9 | 06 | | 36 |
| Digit 7 | F8 | 07 | | 37 |
| Digit 8 | F7 | 08 | | 38 |
| Digit 9 | F6 | 09 | | 39 |
| Power | 7F | F0 | | 55 |
| Vol + | E1 | 33 | | C0 |
| Vol - | E2 | 34 | | C1 |
| Mute | E6 | 35 | | D3 |
| Chan + | D6 | 36 | | C4 |
| Chan - | D7 | 37 | | C5 |
| Last | D9 | 38 | | C6 |
| Sleep | 65 | 65 | | D7 |
| Input | A2 | 7D | | D9 |
| Guide | A3 | B1 | | DA |
| Exit | D2 | B2 | | DB |
| Menu | D3 | B3 | | DC |
| Info | D4 | B4 | | DD |
| Up | 2A | 77 | | 64 |
| Down | 2B | 78 | | 63 |
| Left | 2C | 79 | | 62 |
| Right | 2D | 7A | | 61 |
| Select | A7 | 7B | | E9 |
| PIP On | 7A | F1 | | F7 |
| PIP Off | 51 | C3 | | F1 |
| PIP Swap | C8 | C4 | | B3 |
| PIP Position | C9 | 52 | | B5 |
| PIP CH+ | DD | 55 | | EA |
| PIP CH- | 8F | 59 | | 7E |
| Display | 99 | D3 | | 7F |
| 16:9 | 23 | D5 | | 19 |
| Caption | 1C | 7A | | 2C |
| Video 1 | 17 | 7B | | 1F |
| Video 2 | 9C | 89 | | 13 |
| Video 3 | 9E | 89 | | AE |
| Video 4 | AB | 89 | | AF |
| Secondary Audio | AC | FF | | 96 |
| 100+ | AF | FF | | F3 |
| Effect | 73 | FF | | 47 |

| Extended functions available | Code to enter |
|---|---|
| PIP On | 01 |
| PIP Off | 02 |
| PIP Swap | 03 |
| PIP Position | 04 |
| PIP CH+ | 05 |
| PIP CH- | 06 |
| Display | 07 |
| 16:9 | 08 |
| Caption | 09 |
| Video 1 | 10 |
| Video 2 | 11 |
| Video 3 | 12 |
| Video 4 | 13 |
| Secondary Audio | 14 |
| 100+ | 15 |
| Sleep | 16 |

SYSTEM AND METHOD FOR USING AN UNIVERSAL REMOTE CONTROL TO ACCESS EXTENDED OPERATIONAL FUNCTIONS OF A DEVICE

BACKGROUND

The following relates generally to remote controls and, more particular, relates to a system and method for using an universal remote control to access extended operational functions of a device.

Universal remote controls, which are well-known in the art, typically offer a preprogrammed set of standardized keys for use in commanding common operational functions, such as volume, channel, transport, etc., for each device type supported by the universal remote control, e.g., TV, VCR, DVD, etc. However, unlike a remote control that is supplied with a device, an universal remote control is often incapable of commanding the full range of operational functions available on a device. In this regard, to avoid consumer confusion caused by the use of a large number of keys on an universal remote control, manufacturers of universal remote controls are often required to decide whether or not to provide a key for commanding uncommon functions of a possible target device. By way of example, a manufacturer of universal remote control must decide if the keypad should include a key to command selection of a preferred screen aspect ratio which may be supported by one TV, selection of closed captioning which may be supported by another TV, and/or selection of sophisticated picture-in-picture controls supported by still another TV.

To increase the amount of operational functions that may be commanded via an universal remote control, various methods have been proposed. Examples of such methods may be seen in U.S. Pat. No. 5,515,052, entitled "Universal Remote Control with Function Synthesis," and U.S. Pat. No. 4,959,810, entitled "Universal Remote Control Device," both of which are assigned to the assignee of this application and both or which are incorporated herein by reference in their entirety. While the methods disclosed in these patents have enjoyed some success, they disadvantageously require a consumer to engage in a sometimes lengthy interaction with an external data source, such as a reference manual, customer support hot line, or the like, to obtain numeric values which must then be entered into or programmed on the universal remote control to cause the universal remote control to transmit the desired command(s).

SUMMARY

To address the disadvantages and other problems associated with known methods for programming an universal remote control to control extended operational functions of a device, an improved system and method for using an universal remote control to access extended operational functions of a device is hereinafter disclosed. Generally, the described system and method allows a consumer to program the universal remote control to transmit one or more code data values for causing a device to perform one or more extended operational functions, e.g., operational functions beyond those commonly supported by an universal remote control or those that are uniformly found in devices of a common type. The code data values that are made available for transmission to an intended target device are selected from a library comprising a plurality of code data values for all possible devices supported by the universal remote control.

To program the universal remote control to command an extended operational function, the consumer causes the universal remote control to transmit a code data value selected from the library to a target device while observing the effect of the transmitted code data value on the target device. As will be appreciated, the target device may or may not respond to a transmitted code data value since different devices may support different remotely controllable, operational functions. When the target device responds in a manner desired by the consumer, the consumer may tag the code data value that caused the desired effect and assign the tagged code data value to a programmable key on the universal remote control. The consumer may thereafter activate a programmable key to cause the transmission of the code data value assigned to the activated key to cause the device to perform the extended operational function corresponding to the transmitted code data value. In this manner, the described system and method has the advantage of allowing a consumer to quickly and conveniently program the universal remote control to command those extended operational functions that are: (a) supported by a target device; and (b) deemed important to the consumer.

A better understanding of the objects, advantages, features, properties and relationships of the subject system and method will be obtained from the following detailed description and accompanying drawings which set forth illustrative embodiments which are indicative of the various ways in which the principles of the system and method may be employed.

BRIEF DESCRIPTION OF THE DRAWINGS

For a better understanding of the system and method for using an universal remote control to access extended operational functions of a device, reference may be had to preferred embodiments shown in the following drawings in which:

FIG. 6 illustrates an exemplary data table in which code data values corresponding to conventional operational functions are maintained;

FIG. 7 illustrates an exemplary data table in which code data values corresponding to both conventional and extended operational functions are maintained;

FIG. 11 illustrates another exemplary data table in which code data values corresponding to both conventional and extended functions are maintained; and FIG. 12 illustrates a table for use in assigning extended operational functions to keys.

DETAILED DESCRIPTION

Figure 1:
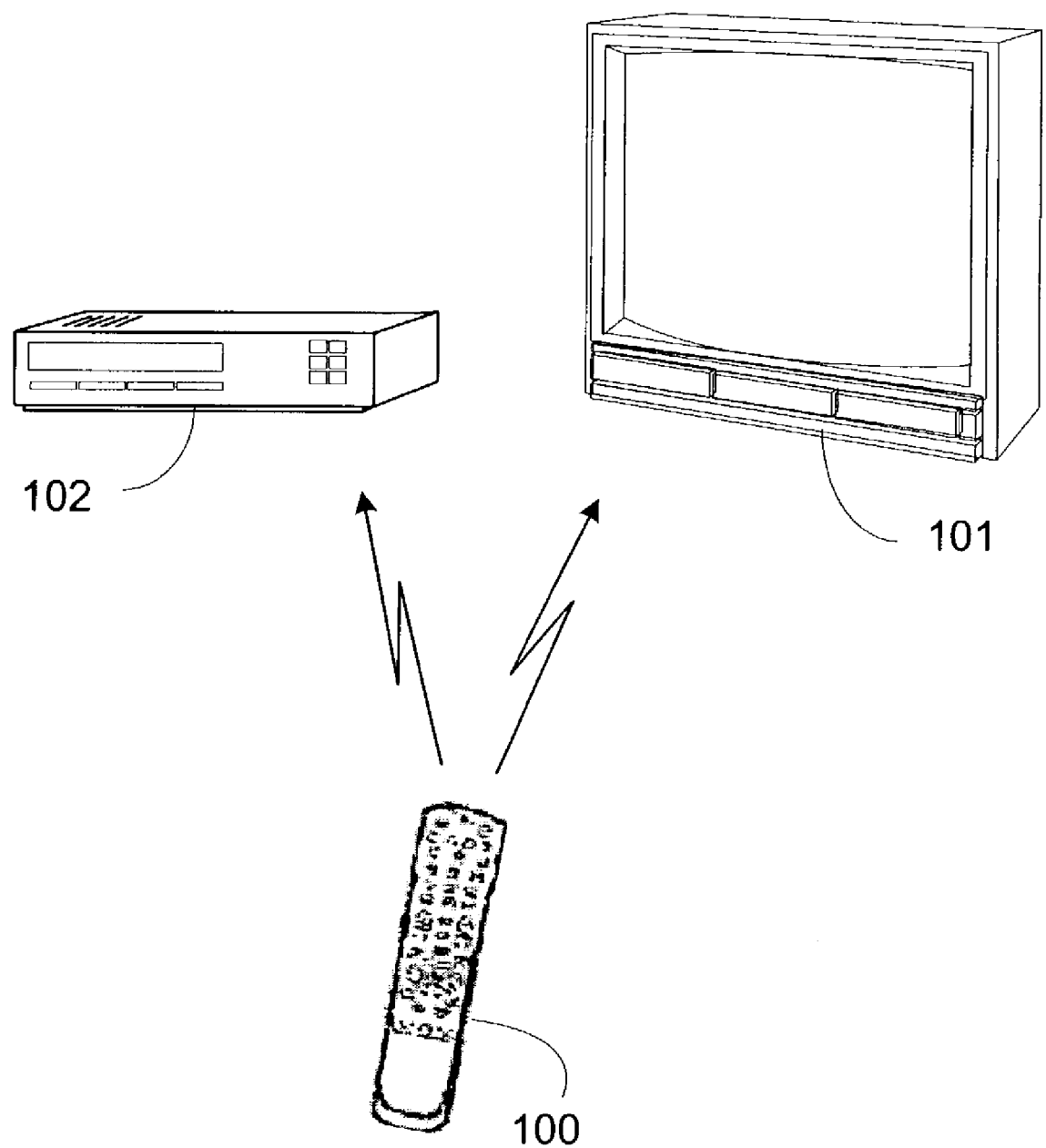
FIG. 1 illustrates an exemplary system in which the universal remote control may be used.

Turning now to the figures, wherein like reference numerals refer to like elements, there is illustrated in FIG. 1 a system in which an universal remote control 100 is usable to access common as well as extended operational functions of a target device. By way of example, a target device may be any type of device that is adapted to respond to commands received from the universal remote control 100, such as the illustrated TV 101 or VCR 102 as well as DVD players, CD players, cable box devices, digital video recording devices, video game devices, home theater devices, home environment devices, personal computers, etc.

Figure 2:
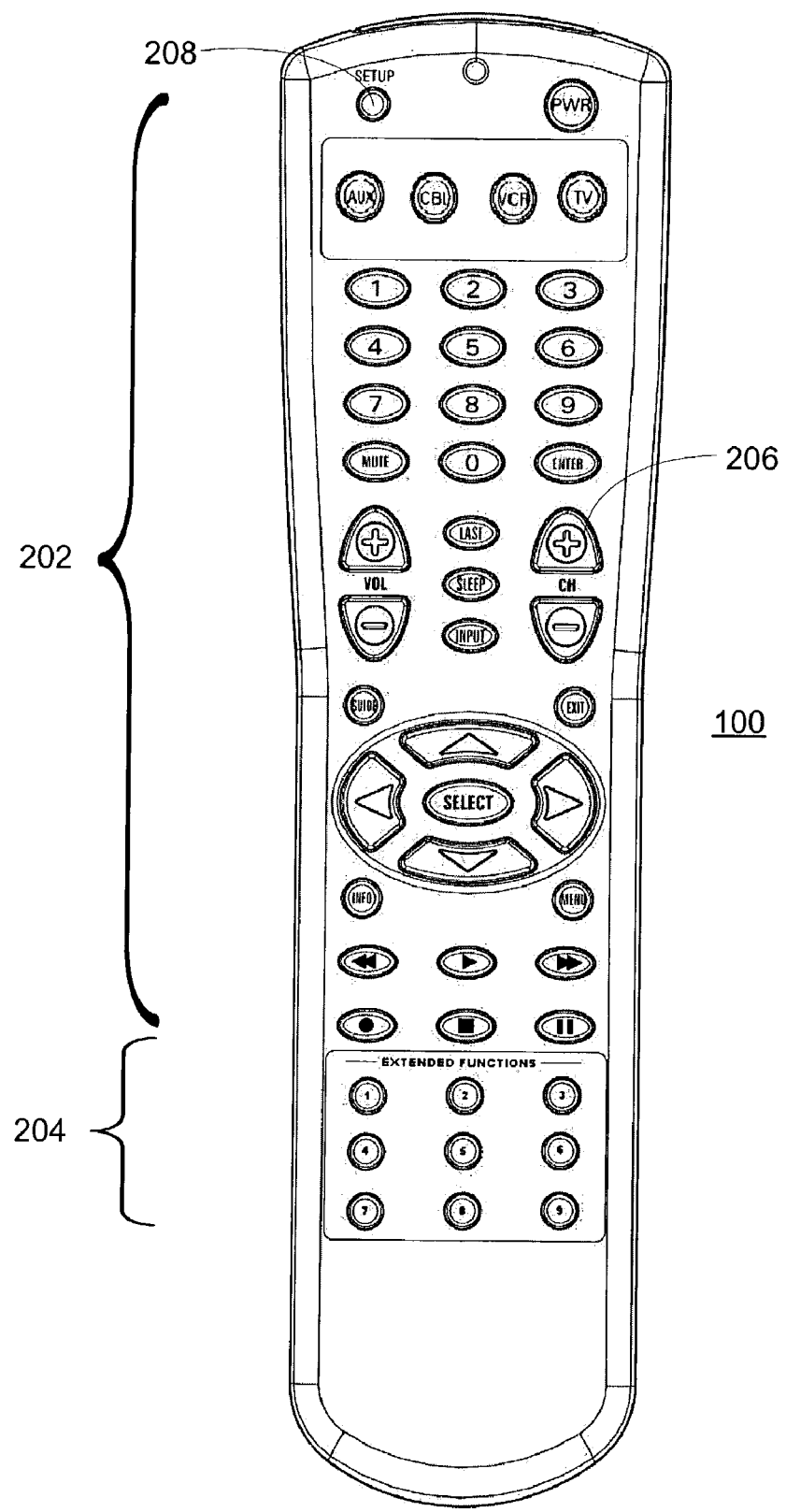
FIG. 2 illustrates a top view of an exemplary universal remote control for use in the system of FIG. 1.

For use in remotely commanding a device to perform a common and/or extended operational function, the universal remote control 100, an example of which is illustrated in FIG. 2, includes a standardized set of keys 202, which are typically assigned to predetermined, common operational functions, as well as a set of "extended" keys 204, which are provided expressly for the purpose of being assigned an extended operational function, as will be described in more detail hereafter. In this regard, common operational functions include functions which are usually included in devices of a common device type (e.g., power, digit tuning, volume control, channel up/down control, media transport, etc.) While extended operational functions include functions that are not typically uniformly supported by devices within a common device type (e.g., closed captioning, picture-in-picture control, etc.). The universal remote control 100 also includes device keys, e.g., "aux," "cbl," "VCR," and "TV," the activation of which places the universal remote control 100 into a mode to transmit commands to a particular type of device. It will be appreciated that, while illustrated as hard keys, the keys 204 and/or the keys 202 of the universal remote control 100 may implemented as soft keys, for example, by being displayed on an LCD touch screen or the like.

Figure 3:
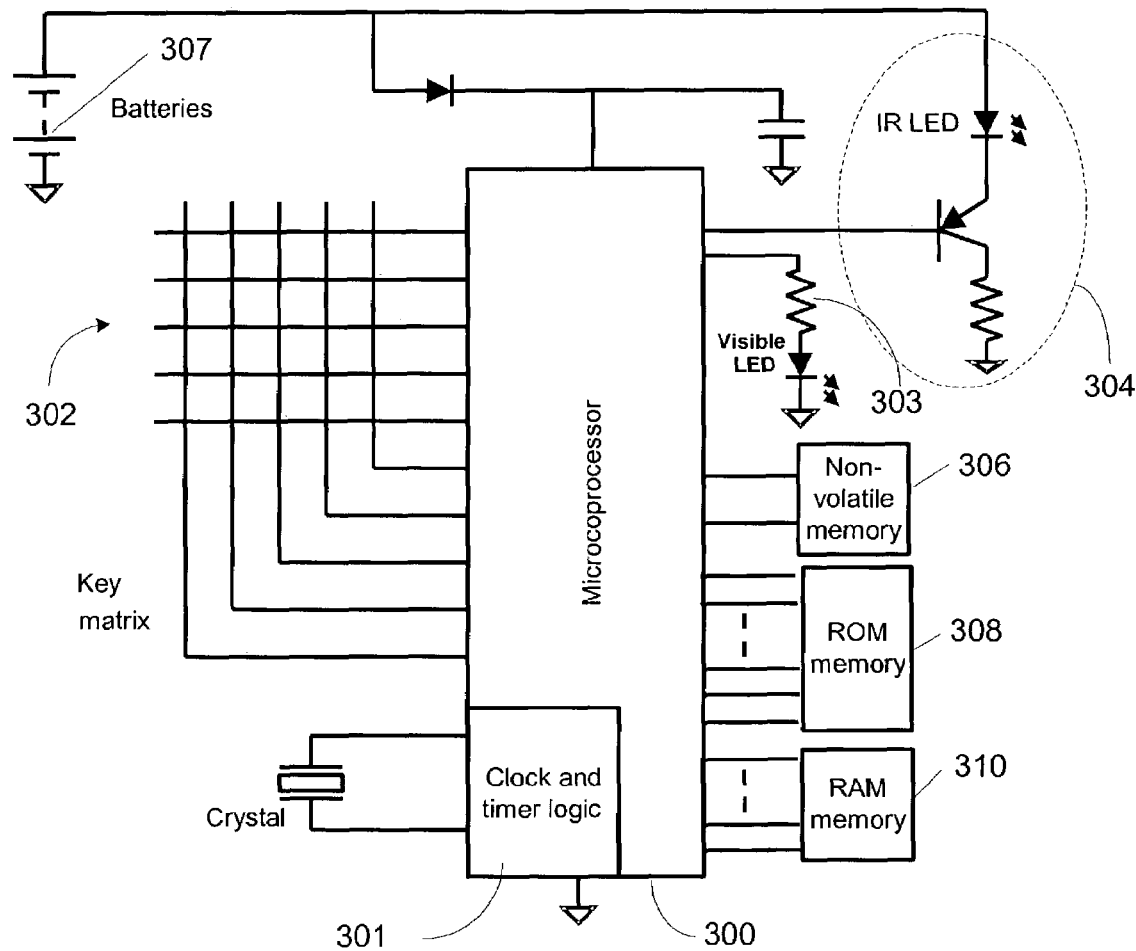
FIG. 3 illustrates a block diagram view of various components of the exemplary universal remote control of FIG. 2.

By way of further example, referring to FIG. 3, the universal remote control 100 may include, as needed for a particular application, a processor 300 coupled to one or more memory devices (such as a ROM memory 308, a RAM memory 310, and/or non-volatile read/write memory 306), a key matrix 302 (e.g., physical buttons, a touch screen display, or a combination thereof), an internal clock and timer 301, transmission circuit(s) 304 (e.g., IR and/or RF), receiver circuit(s) and/or transceiver circuit(s) (e.g., IR and/or RF—not illustrated), a means 303 to provide visual feedback to the consumer (e.g., LED, display, and/or the like), means to provide audio feedback to the user (e.g., a speaker—not illustrated), a power supply 307, serial I/O port (e.g., a jack or contacts—not illustrated), and a bar code scanner—not illustrated. As will be understood by those of skill in the art, the memory device(s) includes executable instructions that are intended to be executed by the processor 300 to control the operation of the universal remote control 100. In this manner, the processor 100 may be programmed to control the various electronic components within the universal remote control 100, e.g., to monitor the power supply 307, to cause the transmission of signals, display icons and/or HTML pages, etc. The non-volatile read/write memory 306, for example, an EEPROM or the like, may be provided to store setup data and parameters as necessary such that data is not required to be reloaded after battery changes. It is to be understood that the memory devices may take the form of any type of readable media, such as, for example, a Smart Card, memory stick, a chip, a hard disk, a magnetic disk, and/or an optical disk. Still further, it will be appreciated that some or all of the illustrated memory devices may be physically incorporated within the same IC chip as the microprocessor 300 (a so called "microcontroller") and, as such, they are shown separately in FIG. 3 only for the sake of clarity.

To cause the universal remote control 100 to perform an action, the universal remote control 100 is adapted to be responsive to events, such as a sensed consumer interaction with the key matrix 302, receipt of a transmission, etc. In response to an event appropriate instructions and/or data within the memory devices are executed and/or accessed. For example, when a command key is activated on the universal remote control 100, the universal remote control 100 may retrieve a code data value corresponding to the activated command key from a memory device and access instructions to transmit the retrieved code data value to a device in a format recognizable by the device. It will be appreciated that the instructions within the memory devices can be used not only to cause the transmission of command codes and/or data to the devices but also to perform local operations. While not limiting, local operations that may be performed by the universal remote control 100 include displaying information/data, favorite channel setup, macro button setup, command function key relocation, etc. Since examples of local operations can be found in U.S. Pat. Nos. 5,481,256, 5,959,751, and 6,014,092 they will not be discussed in greater detail herein. A still further local operation, described hereinafter, allows the consumer to program the universal remote control 100 to access extended operational functions of a device.

Figure 4:
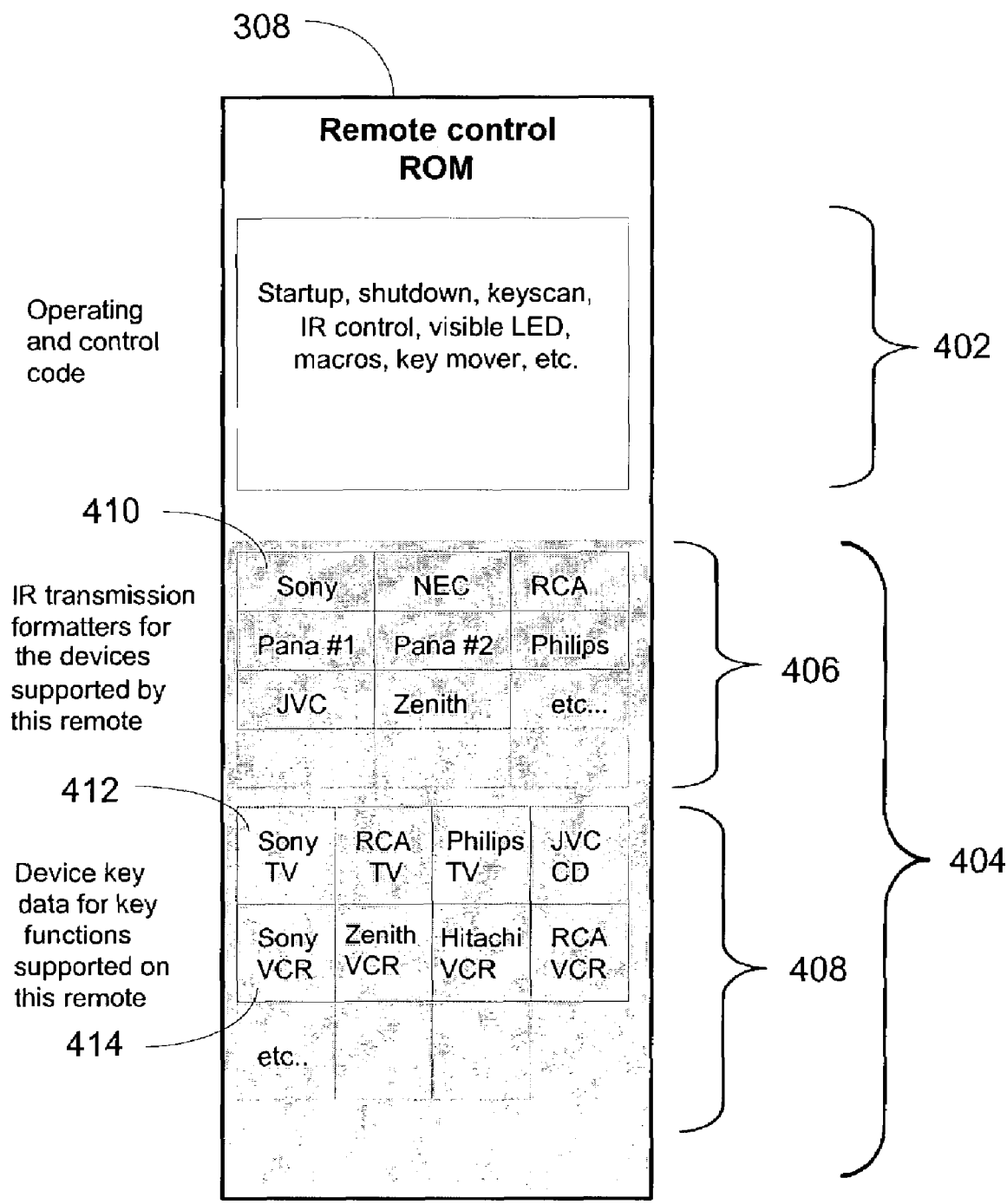
FIG. 4 illustrates a diagram of exemplary data stored in a memory of the universal remote control of FIG. 2.

By way of still further example, an exemplary ROM memory 308 may store both program instructions 402, e.g., to effect local operations of the universal remote control 100, and code data tables 404 which comprise a library of information for use in transmitting code data values to target devices. In the example illustrated in FIG. 4, the code data tables 404 are divided into two groups: descriptions of the transmission formatting used by different target appliance manufacturers 406; and data tables 408 containing code data values to be transmitted to control operational functions of a device. Storing information in this manner is preferred, although not required, as it optimizes use of memory space, e.g., since Sony uses a common IR transmission formatting and encoding arrangement for all its products, it is only necessary to store the Sony transmission formatting information 410 once, even though the library in the remote control includes code data values for both a Sony TV 412 and a Sony VCR 414.

To program the universal remote control 100 to access the common operational functions of a device, the consumer may use one or more known methods for setting up an universal remote control. In this regard, examples of known methods for performing an initial setup of an universal remote control may be found in, for example, the above mentioned U.S. Pat. No. 4,959,810 as well as U.S. Pat. No. 5,614,906, entitled "Method for Selecting a Remote Control Command Set," or U.S. Pat. No. 4,703,359 entitled "Universal Remote Control Unit with Model Identification Capability," each of which is incorporated herein by reference in its entirety.

Once the universal remote control 100 has been setup to control the common operational functions of one or more intended target devices, the consumer may then initiate an extended setup mode for the purpose of programming the universal remote control 100 to allow for the commanding of any extended operational functions of the same intended target device(s). In the extended setup mode, the consumer generally commands the universal remote control 100 to access additional code data values that may be available for a specific device, which device has been previously identified to the universal remote control 100 during the initial setup phase, and to transmit the accessed code data values to the device. Accessed code data values may be transmitted to the device, for example, one by one in sequence, either under the manual control of the consumer via activation of a "step" key or automatically at predetermined intervals. Still further, the sequence in which the code data values are accessed and transmitted may be such that an installed base is considered, i.e., code data values for commanding extended operational functions that have a higher percentage of inclusion in devices of a common device type are accessed and transmitted first. As code data values are being accessed and transmitted to the device, the consumer observes the reaction of the device and whenever a desirable response is invoked, the consumer may take action to assign the code data value just transmitted to one of the group of extended keys 204. If desired, code data value for use in controlling extended functions may also be assigned to override the default functions assigned to keys 202 which are part of the standard key set.

Figure 5:
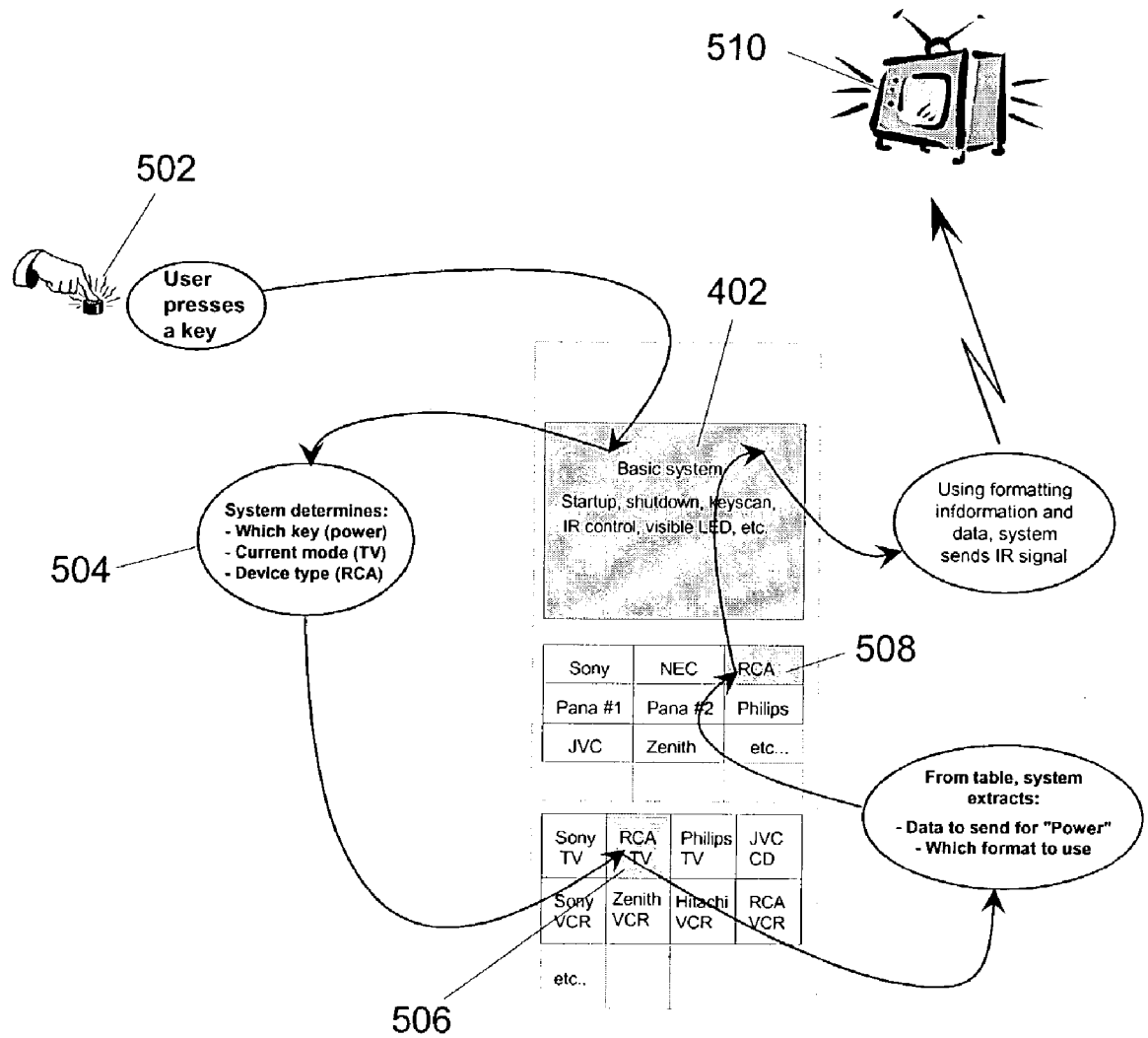
FIG. 5 illustrates an exemplary method for using the universal remote control of FIG. 2 to transmit code data values to a device in the system illustrated in FIG. 1.

With reference to FIG. 5, once the universal remote control 100 has been setup to command the operational functions of a device, the programming 402 of the universal remote control 100 is operational to be responsive to activation 502 of a key. Specifically, the programming 402 may respond to activation 502 of a key by interrogating 504 a key matrix 302 to determine which key or "scan code" was activated. Based on the scan code, the previously entered setup values (e.g., device brand/model entered as part of the initial setup procedure as stored in RAM 310 or non-volatile memory 306), and the device type or "mode" the universal remote control 100 is currently set to control (e.g., TV, VCR, Cable, etc.) the programming 402 determines which operational function is being requested (e.g., Power) and from which data table entry 506 (e.g., RCA TV) the code data value corresponding to that operational function should be retrieved. As previously noted, the data table 506 includes a pointer to the set of formatting information 508 (e.g., RCA) to be used in sending the retrieved code data value to the device. Provided with this information, the programming is then able to cause the code data value to be transmitted in a pattern (e.g., to pulse the IR signaling means 304) that will be recognized by the intended target device (e.g., an RCA TV set 510 as a "Power" command).

With respect to common operational functions, FIG. 6 illustrates an example of a conventional data table in greater detail. It should be noted that the operational function labels shown in the first column of the illustrated data table are presented only for ease of reference as these labels would not be part of the actual data stored in ROM memory since, in practice, the intended resulting operational function of a code data value is implicit by its position in the table which corresponds to a scan code. As described earlier, each device entry (i.e., column in the table 412) includes a header value 602 designating the formatting that is to be used to transmit code data values for that device, followed by a list of code data values 604 corresponding to each of the key functions supported by the universal remote control 100. In general, the header information 602 may also include any fixed data values (e.g., a manufacturer identity) which are to be sent as part of every command transmission, which fixed data values have not been illustrated for the sake of clarity. The reader will also note that the table shown is for TV devices and thus, for example, does not include code data values for common transport functions such as play, rewind, fast forward, etc. Similarly, tables for other device types may exclude various other key function which do not apply to that class of device: the program software 402 takes this into account when mapping key scan codes to table entry locations.

When extended operational functions are available to be controllable through use of the universal remote control 100, the data table would likewise be extended, as illustrated by way of example in FIG. 7, to include those extended operational functions. In the illustrated, example data table 412', up to sixteen additional, extended operational functions 702 are shown as being available for each device. Since these additional, extended operational functions would not be standard across all devices, they are not amenable to being identified by specific labels and, as such, a generic "Extra" designation has been used. In instances where a particular device does not support sufficient additional operational functions to completely fill all positions in the table 412', entries in the table may be filled with a duplicate of a previous operation function, as illustrated at 706, or by a "null" value such as, for example, all ones or all zeros. It will also be appreciated by those of ordinary skill in the art that alternative methods such as, for example, prefixing each device table with a counter indicating how many entries are present, interpretation of a null value as an end of data marker truncating the series of entries, etc., may be applied in the management of this data where advantageous.

Since the universal remote control 100, by design, fails to have keys sufficient to be mapped to each of the additional, extended operational functions, (e.g., sixteen extra functions are illustrated as being provided for each device while there are only nine keys 204 available on the remote control available for assignment), provision is to be made to allow the consumer to select which of the additional, extended operational functions the consumer desires to assign to which key, and to store that information for use during future operation of the universal remote control 100.

Figure 8:
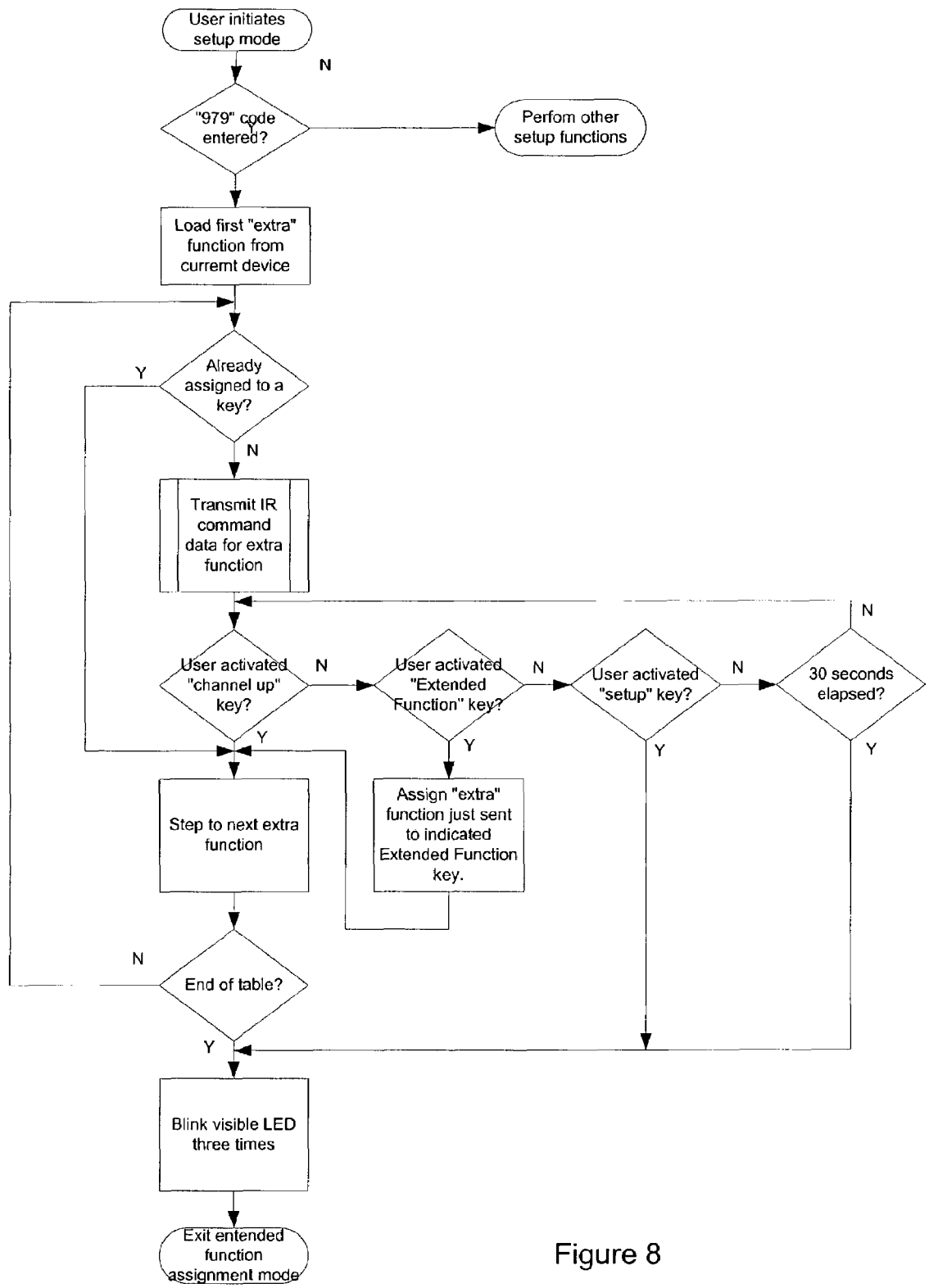
FIG. 8 illustrates a flow chart diagram of an exemplary method for setting up the universal remote control of FIG. 2 to provide access to extended operational functions.

To allow the consumer to select which of the additional, extended functions the consumer desires to assign to which key, after the consumer has completed the initial setup of the universal remote control 100 to operate the standard functions of one or more intended target devices, the extended configuration mode may be entered, for example, by entering a special setup code such as by activating the "9," "7," and "9" keys on the universal remote control keypad. In response to the consumer entering the extended setup mode, the programming 402 may provide for the consumer to individually step through all of the available, extended operational functions, i.e., code data values, available for an intended target device (i.e., the device setup in the universal remote control 100 for the current device mode of the universal remote control 100), test the response of the target device to each transmitted code data value, and select those code data values the consumer wishes to assign to one or more of the programmable keys (extended keys 204 or standard key 208). In the example illustrated in FIG. 8, the consumer may manually advance through the code data values to test each extended operational function by pressing the "channel up" key 206. When stepping through code data values, it is preferred that any code data values that have already been assigned to a programmable key (extended keys 204 or standard key 208) are automatically skipped. If the user observes a desirable reaction from that target device in response to the transmission of a code data value, the consumer may activate one of the "Extended Function" keys 204 (labeled "1" through "9"), or one of the keys 202, instead of pressing "channel up," to which the code data value just transmitted is then automatically assigned. The consumer may exit the extended function setup programming, for example, by activating the "Setup" button 208. The extended function setup programming may also be caused to automatically exit when the end of the table 412' has been reached or if there is no action by the consumer for a predetermined time, such as thirty seconds. It will also be appreciated that variations of this algorithm are possible, for example, the extended function setup programming may step though the available extended functions automatically at predetermined (or user selectable) intervals instead of waiting for a consumer to manually activate a key, the programming may loop back rather than exit when the end of the table 412' is reached, the programming may allow the consumer to manually step (or change the automatic stepping) in both a forward and backward direction through the available extended operational functions (e.g., by activating the "channel down" as well as "channel up" keys), the programming may not skip extended functions which are already assigned, etc.

Figure 9:
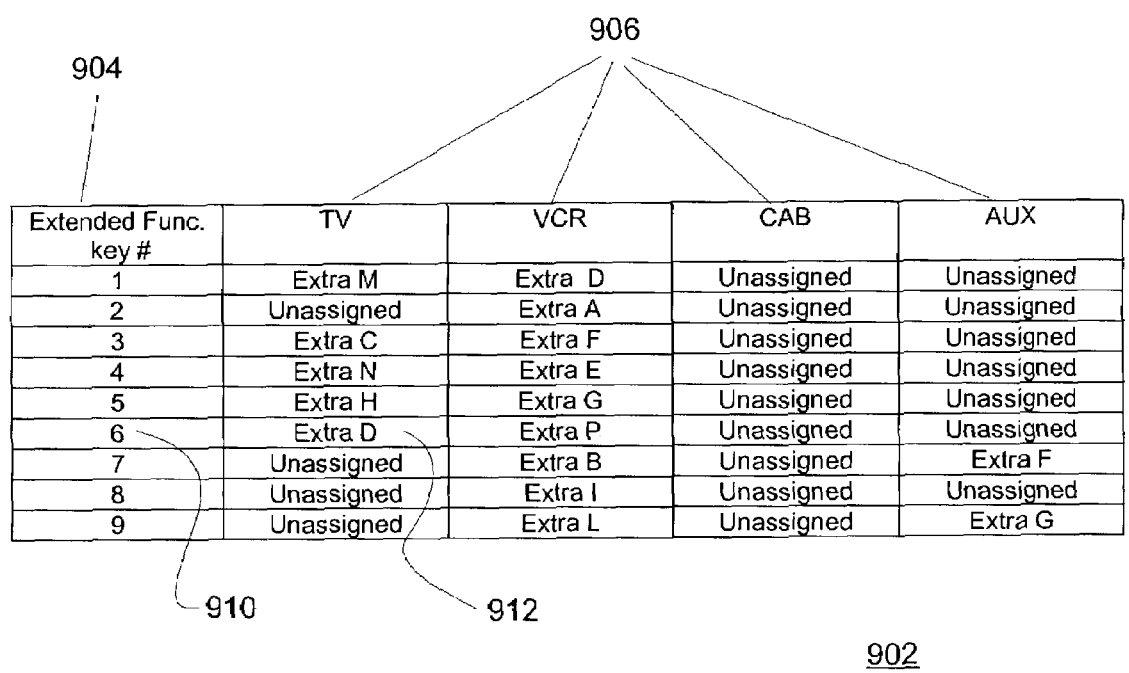
FIG. 9 illustrates an exemplary table of key assignments resulting from the performance of the method illustrated in FIG. 8.

To store extended operational function selections made by a consumer, several methods may be used. For example, as illustrated in FIG. 9, a table 902 can be maintained, e.g., in non-volatile memory, that serves to cross reference the physical scan codes of the extended function keys to logical scan codes 906 which are then, in turn, used to access the code data values 702 for each device. In the example illustrated in FIG. 9, if a TV device corresponding to set up code "002" was setup to be active in the universal remote control 100 and extended key number "6" was sensed to have been activated, the programming 402 would first inspect the table of FIG. 9 at row 910 to ascertain from the TV device column at entry 912 that the desired extended operational function is the extended operational function that was stored at "Extra D" in the TV device command data table 412' and then use that value (i.e., as the logical scan code) to retrieve the code data value 704 to be transmitted for TV device "002" (e.g., "52" from FIG. 7).

Figure 10:
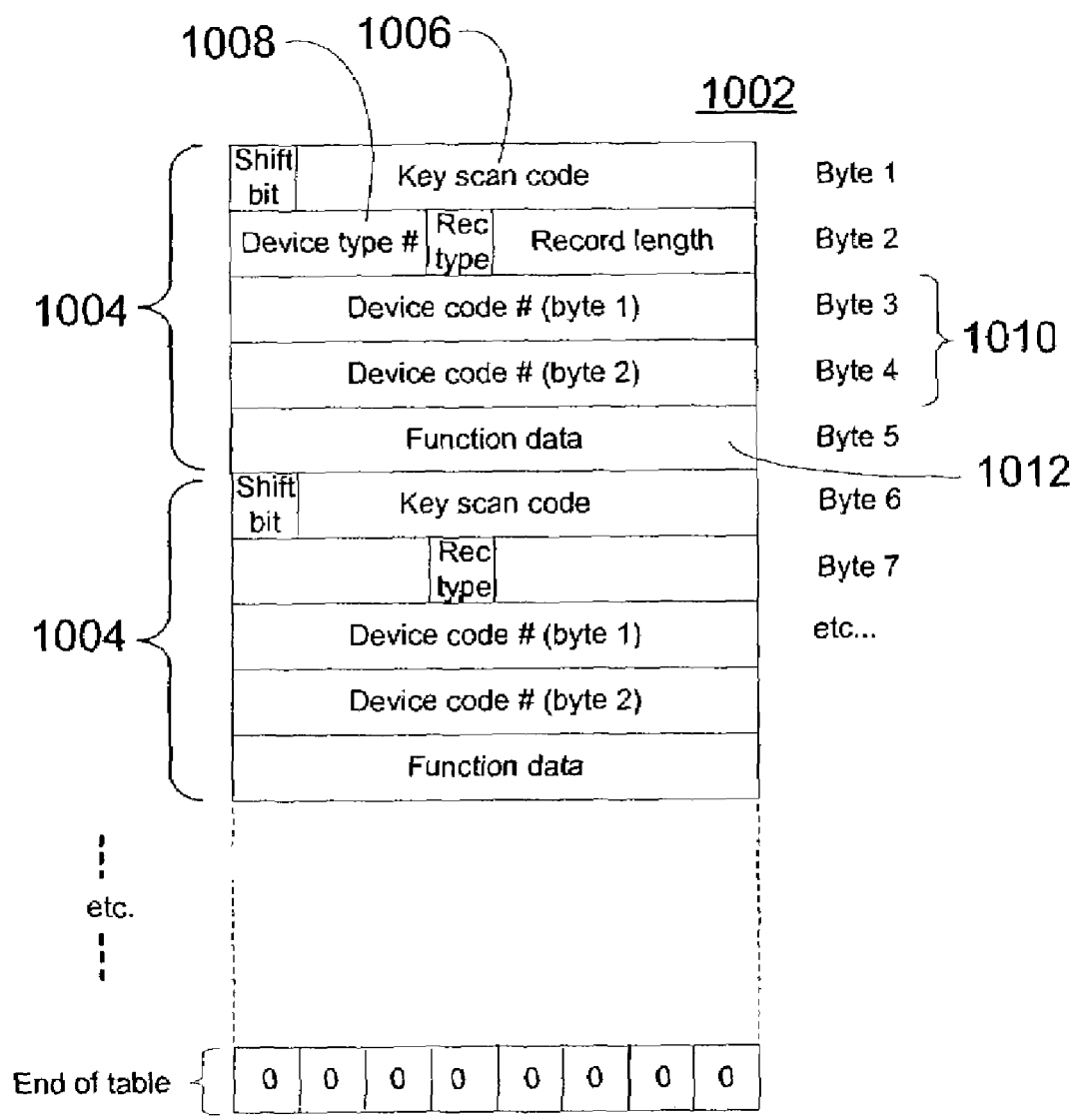
FIG. 10 illustrates another exemplary table of key assignments.

A further method for storing extended operational function selections made by a consumer is illustrated in FIG. 10. In accordance with this alternative method, a key reassignment table 1002 may be maintained, e.g., in non-volatile memory, which includes one or more records 1004 each of which comprises a plurality of data fields in which is maintained data that is indicative of a key scan code 1006, a device type 1008, a setup code 1010, and a code data value 1012 to be transmitted in response to activation of the key corresponding to the key scan code 1006. Thus, in keeping with this method, whenever a key is pressed, the programming 402 would first search the reassignment table 1002 for a match on the key scan code generated by the activated key and, if a match is found, the code data value indicated by the key reassignment table 1002 is transmitted. If, however, no match is found, the programming 402 would process the key scan code in a manner such as described earlier. It will be appreciated that, in certain applications, this approach offers more flexibility since it allows extra functions to be assigned to any key, not just the extended keys 204 provided for that specific purpose. This table structure may also be commonly shared by other features of the remote control such as for example, the "Key Mover" feature that is described in commonly assigned U.S. Pat. No. 6,195,033.

Still further, as illustrated in FIG. 11, a fixed set of operational functions may be provided across every device model in a table 1102. In instances where a particular device does not offer a particular operational function, entries in the table corresponding to that operational function may be filled with a duplicate of a similar operational function, as illustrated at 1104, or by a "null" value, as illustrated at 1106. By way of example only, a "null" value may be indicated for a device by being represented using all ones or zeros. Table management may also be performed using any of the methods described previously with respect to the table illustrated in FIG. 7. As will be appreciated, using this approach will still result in more operational functions being available than keys on which to place them. Therefore, consumers should still be provided with a means to select and assign to available keys subsets of those operational functions (i.e., the code data values corresponding to the operational functions) deemed most useful by them.

To select and assign operational functions to available keys using the table illustrated in FIG. 11, any of the methods previously described could be used. Furthermore, since the operational functions offered are known in the case of the table illustrated in FIG. 11, the consumer can be provided with a printed or otherwise viewable cross-reference table 1202, an example of which is illustrated in FIG. 12, and the extended setup operation may consist simply of initiating an extended setup programming mode and then entering into the universal remote control 100 one of the code numbers 1204 that is representative of an available, extended operational function as well as an indication of a key to which the code data value corresponding to the code number 1204 is to be assigned. The results of these mapping indications may then be stored in a table using a format similar to the table 902 illustrated in FIG. 9.

It is to be further appreciated that a mapping table, such as mapping table 902, can serve as a "user profile" so that, for example, should the consumer purchase a new device at some time in the future, e.g., to replace an old device, the functionality indicated as being desirable for a reference device, e.g., the old device, can be automatically included as part of a table entry for the new device. Populating the mapping table 902 for the new device considering the selections for a reference device, typically of the same device type, may be performed automatically (or at consumer discretion) as part of the programming that is used to initially setup the universal remote control 100 to command the operational functions of the new device. In the case where the universal remote control 100 has been setup to control multiple devices of the same device type, provision may be made to allow the consumer to select which of the multiple device setups is to be used as the reference setup. Once the mapping table is populated in this manner, the consumer may then edit the assignments should the new device fail to support previously specified operational functions, should the consumer desire to change the extended operational functions supported, etc. It is also contemplated that the mapping table 902, as well as other stored setup information, may be transferable between universal remote controls 100 to ease in the setting up of multiple universal remote controls 100. Still further, it is contemplated that a unique table can be maintained for each consumer that is to use the universal remote control 100, in cases where the universal remote control 100 is adapted to recognize individual users thereof, so that each consumer user can have access to those extended operational functions that are personally desirable. Finally, it will be appreciated that the universal remote control 100 may be provided with communications capabilities whereby the data that populates a composite operational function table, illustrated by way of example in FIGS. 7 and 11, may be updated. An example of an universal remote control having such communication capabilities is described in the commonly assigned U.S. Pat. No. 4,959,810.

While various embodiments of a system and method for using an universal remote control to access extended operational functions of a device have been described in detail, it will be appreciated by those skilled in the art that various modifications and alternatives to those details could be developed in light of the overall teachings of the disclosure. For example, it should be appreciated that any of the above described methods can be used alone or in combination to setup an universal remote control. Additionally, the functionality of the universal remote control can be included in other devices such as PDAs, personal computers, home devices, or the like. Accordingly, it will be understood that the particular arrangements and procedures disclosed are meant to be illustrative only and not limiting as to the scope of the invention which is to be given the full breadth of the appended claims and any equivalents thereof.

What is claimed is:

1. A method for using an universal remote control to access extended operational functions of a device, comprising:
    (a) accepting input into the universal remote control that serves to identify a library of code data values stored in a memory device of the universal remote control wherein the library of code data values includes both code data values for use in commanding the device to perform common operational functions and code data values for use in commanding the device to perform extended operational functions;
    (b) mapping the code data values from the identified library of code data values for use in commanding the device to perform common operational functions to standard keys of the universal remote control;
    (c) accepting input into the universal remote control for causing the universal remote control to transmit a signal including a code data value from the identified library of code data values for use in commanding the device to perform an extended operational function; and
    (d) accepting input into the universal remote control to map to a programmable key of the universal remote control the code data value from the identified library of code data values for use in commanding the device to perform an extended operational function that was last transmitted by the universal remote control in step (c).

2. The method as recited in claim 1, wherein the common operational function comprises a channel selection function.

3. The method as recited in claim 1, wherein the common operational function comprises a volume selection function.

4. The method as recited in claim 1, wherein the common operational function comprises a transport function.

5. The method as recited in claim 1, wherein step (c) comprises automatically transmitting in response to the user input a plurality of signals each having a different code data value from the identified library of code data values for use in commanding the device to perform an extended operational function.

6. The method as recited in claim 5, further comprising skipping the transmission of a signal for those code data values from the identified library of code data values for use in commanding the device to perform an extended operational function which has been previously assigned to a programmable key.

7. The method as recited in claim 1, wherein a portion of the code data values from the identified library of code data values for use in commanding the device to perform an extended operational function comprise a null value.

8. The method as recited in claim 7, wherein a null value demarks an end of a table in which are stored the code data values.

9. The method as recited in claim 1, wherein the code data values of the identified library of code data values are maintained in a table which includes data indicative of a number of code data values in the identified library of code data values for use in commanding the device to perform an extended operational function that are in the table.

10. The method as recited in claim 1, wherein the programmable key comprises an extended function key provided on the universal remote control.

11. The method as recited in claim 1, wherein the transmitted code data value from the identified library of code data values is mapped to a standard key on the universal remote control in lieu of the code data value from the identified library of code data values for use in commanding the device to perform a common operational function that was mapped to that standard key in step (b).

12. A method for using an universal remote control to access extended operational functions of a device, comprising:
    (a) accepting input into the universal remote control that serves to identify a library stored in a memory of the universal remote control, the library comprised of a plurality of code data values for use in commanding the device to perform operational functions;
    (b) mapping a subset of the code data values from the identified library to a subset of a plurality of keys of the universal remote control;
    (c) accepting input into the universal remote control for causing the universal remote control to transmit a signal including a code data value from the identified library for use in commanding the device to perform an operational function which is unassigned to the subset of the plurality of keys; and
    (d) accepting input into the universal remote control to map to a programmable key of the universal remote control the code data value from the identified library that was last transmitted by the universal remote control in step (c).

13. The method as recited in claim 12, wherein the identified library includes code data values for use in commanding all of the operational functions available to be performed by the device using a remote control supplied with the device.

14. The method as recited in claim 12, wherein the identified library includes code data values for use in commanding operational functions in a number that exceeds the plurality of keys of the universal remote control.

15. The method as recited in claim 14, wherein the code data values for use in commanding the device to perform an operational function which are unassigned to the subset of the plurality of keys exceeds in number extended keys of the universal remote control.

16. The method as recited in claim 12, wherein the identified library includes code data values having a null value.

17. The method as recited in claim 16, wherein the null value demarks an end of the identified library.

18. The method as recited in claim 12, wherein the identified library comprises data indicative of a number of code data values in the identified library which are unassigned to the subset of the plurality of keys.

19. The method as recited in claim 12, wherein the programmable key comprises an extended function key provided on the universal remote control.

20. The method as recited in claim 12, wherein the transmitted code data value from the identified library is mapped to one of the subset of the plurality of keys on the universal remote control in lieu of the code data value from the identified library for use in commanding the device to perform an operational function that was mapped to that one of the subset of the plurality of keys in step (b).

21. The method as recited in claim 12, further comprising automatically transmitting in response to the user input a plurality of signals each having a different code data value from the identified library for use in commanding the device to perform operational functions which are unassigned to the subset of the plurality of keys.

22. The method as recited in claim 21, further comprising skipping the transmission of a signal for those code data values from the identified library for use in commanding the device to perform an operational function which have been previously assigned to a key of the universal remote control.

23. An universal remote control, comprising:
a memory storing a plurality of libraries each comprised of a plurality of code data values for use in commanding a corresponding device to perform operational functions;
a keypad comprising a plurality of keys including at least one programmable key;
a transmission circuit for use in transmitting a signal; and
programming for performing the steps of: (a) accepting input that serves to identify one of the plurality of libraries stored in memory; (b) mapping a subset of the code data values of the identified one of the plurality of libraries to a subset of the plurality of keys; (c) accepting input for causing the transmission circuit to transmit a signal including a code data value from the identified one of the plurality of libraries which is unassigned to the subset of the plurality of keys; and (d) accepting input to map to a programmable key the code data value last transmitted by the transmission circuit in step (c).

24. The universal remote control as recited in claim 23, wherein the identified library includes code data values for use in commanding all of the operational functions available to be performed by the device using a remote control supplied with the device.

25. The universal remote control as recited in claim 23, wherein the identified library includes code data values for use in commanding operational functions in a number that exceeds the plurality of keys of the universal remote control.

26. The universal remote control as recited in claim 25, wherein the code data values for use in commanding the device to perform an operational function which are unassigned to the subset of the plurality of keys exceeds in number extended keys of the universal remote control.

27. The universal remote control as recited in claim 23, wherein the identified library includes code data values having a null value.

28. The universal remote control as recited in claim 27, wherein the null value demarks an end of the identified library.

29. The universal remote control as recited in claim 23, wherein the identified library comprises data indicative of a number of code data values in the identified library which are unassigned to the subset of the plurality of keys.

30. The universal remote control as recited in claim 23, wherein the transmitted code data value is mapped to an extended function key provided on the universal remote control.

31. The universal remote control as recited in claim 23, wherein the transmitted code data value is mapped to one of the subset of the plurality of keys on the universal remote control in lieu of the code data value for use in commanding the device to perform an operational function that was mapped to that one of the subset of the plurality of keys in step (b).

32. The universal remote control as recited in claim 23, further comprising automatically transmitting in response to the user input a plurality of signals having code data values for use in commanding the device to perform operational functions which are unassigned to the subset of the plurality of keys.

33. The universal remote control as recited in claim 32, further comprising skipping the transmission of a signal for those code data values for use in commanding the device to perform an operational function which have been previously assigned to a key of the universal remote control.

34. The universal remote control as recited in claim 23, further comprising accepting input for causing data indicative of the code data value that is mapped to the programmable key to be transmitted to another universal remote control.

35. A method for using an universal remote control to access extended operational functions of a device, comprising:
accepting input into the universal remote control that serves to identify one of a plurality of libraries wherein each library is used to command a device to perform common operational functions and extended operational functions;
mapping common operational functions selected from the identified one of the plurality of libraries to standard keys of the universal remote control; and
automatically mapping extended operational functions selected from the identified one of the plurality of libraries to programmable keys of the universal remote control as a function of which extended operational functions selected from a previously identified one of the plurality of libraries were mapped to the programmable keys of the universal remote control.

* * * * *